J. CHEIN.
GO-CART.
APPLICATION FILED DEC. 9, 1914.

1,181,569. Patented May 2, 1916.

Witnesses:
C. S. Ashley
Justin C. Palland

Inventor
Julius Chein
By his Attorney

UNITED STATES PATENT OFFICE.

JULIUS CHEIN, OF MONTCLAIR, NEW JERSEY.

GO-CART.

1,181,569.  Specification of Letters Patent.  Patented May 2, 1916.

Application filed December 9, 1914. Serial No. 876,355.

*To all whom it may concern:*

Be it known that I, JULIUS CHEIN, a citizen of the United States, and resident of Montclair, in the county of Essex and State of New Jersey, have invented certain new and useful Improvements in Go-Carts, of which the following is a specification.

My invention relates to improvements in go-carts and the object of my invention is to provide a simple and convenient device of the character described. I accomplish this object by the device illustrated in the accompanying drawings, in which—

Figure 1:
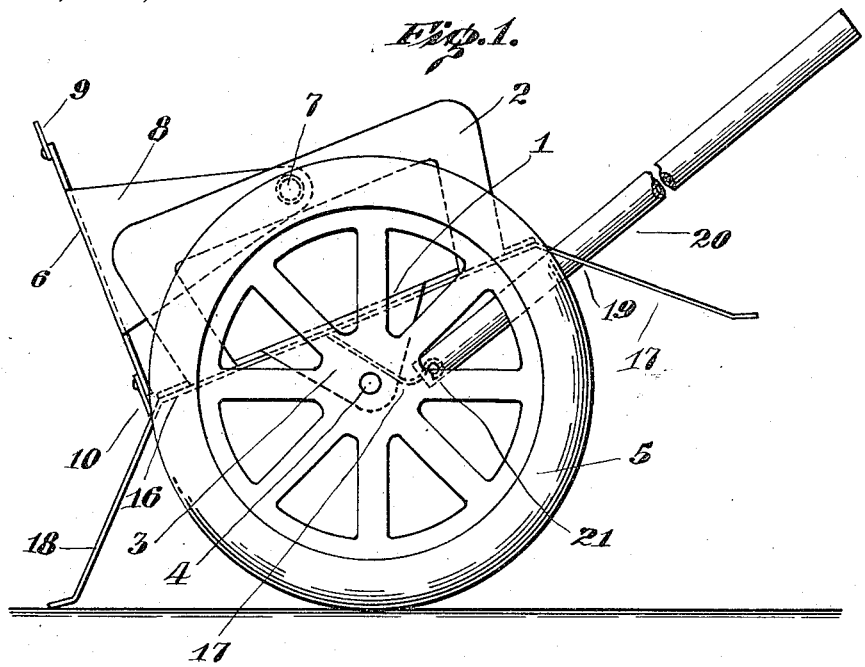
Figure 2:
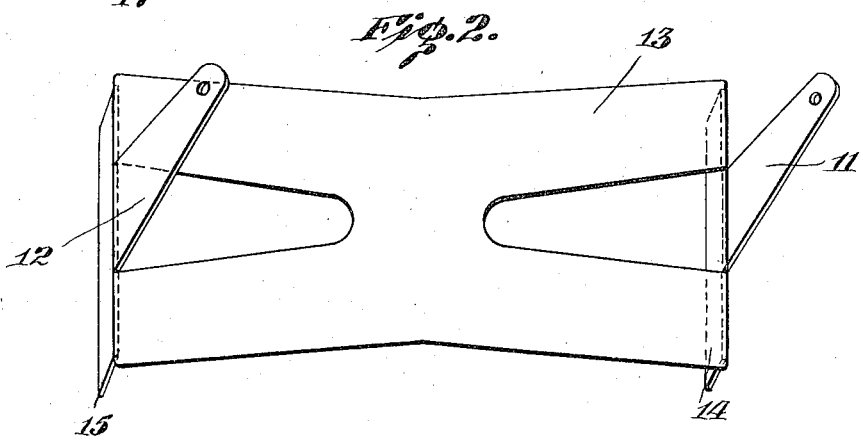
Figure 3:
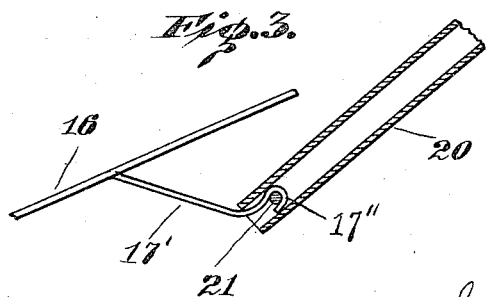

Figure 1 is a perspective view of the device. Fig. 2 is a view of an optional form of the reversible back and Fig. 3 is a detail view of the device for attaching the shaft.

Similar characters refer to similar parts throughout the several views.

I prefer to construct my improved go-cart of sheet metal, but it may be constructed of wood or of any other material when desired.

The body of my improved go-cart comprises a bed 1 preferably constructed of sheet metal having its side sections each cut into two parts, one of which is bent upwardly to form side arms 2, and the other of said parts 3 is bent downwardly to receive the axle 4 carrying the wheels 5. On the arms 2 I journal the reversible back rest 6, adapted to be used interchangeably at the front and rear, by means of pins 7.

The back rest 6 is preferably formed of a strip of sheet metal having its end sections 8 bent over at right angles to engage the side arms 2.

The back rest 6 may be provided at top and bottom with strengthening strips 9 and 10, or it may be constructed as shown in Fig. 2 by cutting out tongues 11, 12 which are bent over at right angles to the back section 13 leaving marginal edge sections 14, 15 which respectively are bent over in a direction reverse to the tongue and at a right angle to the back 13 for the purpose of strengthening the back.

On the under side of the bed 1 I provide a longitudinal bar 16 preferably of a single strip of iron or the like having its end sections 17 and 18 bent downwardly to form supports of sufficient length to hang clear of the ground when the cart is run upon its wheels and to support the cart when standing. A section of the bar 16 intermediate its ends is preferably cut out to form an integral tongue 17′ which is bent downwardly and has its end section bent over to form a loop or hook 17″, but this tongue 17′ may be separable from the bar 16 if desired. In the end section 17 of the bar 16 I provide an aperture 19 through which is inserted a tube 20 which constitutes the shaft by which the cart is drawn or pushed as desired. The lower end section of the shaft 20 is apertured to receive a pin 21. The shaft 20 is inserted through the aperture 19 in the end section 17 of the bar 16 and is placed over the hook 17″, a pin 21 is then inserted through the apertures in the shaft 20 securing the shaft in position.

Having thus described my invention, what I claim is:

1. A cart having a body comprising a bed having its side sections each cut into two parts, one of which parts is bent upwardly to form side arms and the other of said parts is bent downwardly to form supports and a reversible back section on the arms and adapted to be used interchangeably at the front and rear of the cart substantially as shown and described.

2. A cart provided with a longitudinal bar having its end sections bent downwardly to form supports and having an integral cut out tongue provided with a bent over end section and apertured to receive a shaft substantially as shown and described.

3. A go-cart body comprising a bed and side sections divided to present independent parts, one part of each side section being bent upwardly to form arm members, and the other part thereof being bent to receive an axle.

Signed at New York, in the county of New York and State of New York, this 1st day of December, A. D. 1914.

JULIUS CHEIN.

Witnesses:
SAMPSON H. SCHWARZ,
JUSTIN S. GALLAND.

Copies of this patent may be obtained for five cents each, by addressing the "Commissioner of Patents, Washington, D. C."